United States Patent [19]

Mettler

[11] 4,094,183
[45] June 13, 1978

[54] METHOD OF FABRICATING A SUBSTANTIALLY U-SHAPED BODY AND APPARATUS FOR THE PERFORMANCE THEREOF

[75] Inventor: Karl Mettler, Buchs, Switzerland

[73] Assignee: Press- & Stanzwerk AG, Eschen, Liechtenstein

[21] Appl. No.: 747,795

[22] Filed: Dec. 6, 1976

[30] Foreign Application Priority Data

Dec. 19, 1975 Switzerland ............ 16489/75

[51] Int. Cl.² ............................................. B21D 22/00
[52] U.S. Cl. ........................................ 72/356; 72/344; 72/359; 72/377
[58] Field of Search ............ 72/344, 352, 353, 354, 72/356, 358, 359, 360, 377; 403/57, 58; 29/175 R, 175 A, DIG. 18

[56] References Cited

U.S. PATENT DOCUMENTS

| 412,311 | 10/1889 | Wagener | 72/358 |
| 1,638,400 | 8/1927 | Kinsler | 403/57 X |
| 1,925,721 | 9/1933 | Johnston | 72/360 X |
| 2,748,932 | 6/1956 | Kaul | 72/356 X |
| 4,015,461 | 4/1977 | Schober | 72/360 X |

Primary Examiner—Leon Gilden
Attorney, Agent, or Firm—Werner W. Kleeman

[57] ABSTRACT

A method of, and apparatus for, fabricating a substantially U-shaped body, especially a fork-type joint of a Cardan or universal joint from a blank which is worked by cold press forming while using dies and punches. During a first step there is extruded from a substantially parallelepiped-shaped blank two leg members with the aid of a first die and a first punch, and during a second step the pressed-out or extruded legs are brought into a final shape with the aid of a second die and a second punch.

6 Claims, 10 Drawing Figures

METHOD OF FABRICATING A SUBSTANTIALLY U-SHAPED BODY AND APPARATUS FOR THE PERFORMANCE THEREOF

BACKGROUND OF THE INVENTION

The present invention relates to a new and improved method of, and apparatus for, fabricating a substantially U-shaped body, especially a bifurcated or fork-type joint for a Cardan or universal joint from a blank or unfinished part, which is worked by cold impact or press forming while using dies and punches.

Different techniques are known in the art for fabricating a U-shaped body. In particular, such bodies are forged from one piece. This is associated with the drawback that the body subsequently must be heat-treated or tempered and there is required considerable material-removing finishing work, for instance it is necessary to subsequently carry out face milling and drilling operations.

Also, it is known to stamp such type bodies from sheet metal. Yet, this is associated with the drawback that the body does not possess adequate rigidity for many fields of application.

Additionally, it is also known to fabricate such bodies from two parts which are subsequently welded together. This, however, is associated with the disadvantage that the welding operation requires a relatively large amount of work.

Finally, it is also part of the state-of-the-art to fabricate such type bodies by cold impact or press forming techniques, for instance, as disclosed in U.S. Pat. Nos. 1,925,721 and 2,120,118. However, with these techniques the forming work is maintained as small as possible, so that equally the strength which is achieved by such cold working is relatively small. Moreover, splitting of the blank for forming both legs or leg members is associated with the disadvantage that there are formed sharp edges requiring a further machining operation.

SUMMARY OF THE INVENTION

Hence, it is a primary object of the present invention to provide a new and improved method of, and apparatus for, fabricating a substantially U-shaped body or part in a manner not associated with the aforementioned drawbacks and limitations of the prior art proposals.

Another and more specific object of the present invention is directed to avoiding the aforementioned drawbacks and devising a fabrication method, by means of which it is possible to produce relatively inexpensively, with very little subsequent machining work, and in large numbers, parts having great strength and accurate shape.

Still a further significant object of the present invention concerns a new and improved method of, and apparatus for, fabricating parts from a blank in an extremely efficient, reliable and accurate manner, with extreme production economies and conductive to mass-production operations.

Now in order to implement these and still further objects of the invention, which will become more readily apparent as the description proceeds, the method the present development is manifested by the features that during a first method step there is pressed-out or extruded from a substantially parallelepiped-shaped blank two legs or leg members with the aid of a first die and a first punch, and that during a second method step the extruded legs are brought into the final shape with the aid of a second die and a second punch.

Not only is the invention concerned with the aforementioned method aspects, but also relates to apparatus for the performance thereof. This apparatus, according to a first exemplary embodiment, is manifested by the features that for both method steps the die completely corresponds to the shape of the legs which are to be formed of the fork-type body, and that the part of the punch contacting the blank is flat. Further, according to a second exemplary embodiment of apparatus, it is contemplated that for both method steps the shape of the legs to be formed of the fork-type body is partially imparted by the dies and partially by the punch.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
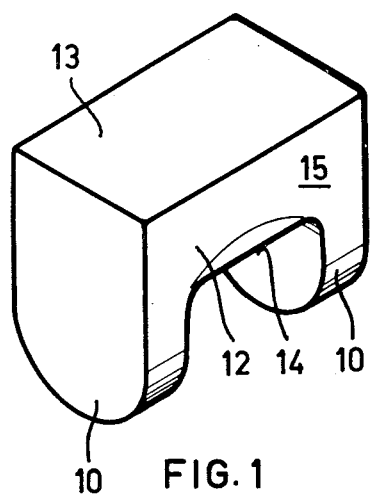
FIG. 1 is a perspective view of a substantially U-shaped body or body member, in a semi-finished condition, and produced according to a first method of the invention.

Describing now the drawings, the substantially U-shaped body or part depicted in FIG. 1 will be seen to comprise two short legs or leg members 10 and an interconnecting web 12. The web 12 possesses at the side opposite both of the legs 10 a completely flat or planar fork base or bottom 13. The fork saddle 14 of the web 12, and which is located opposite the fork base 13, is markedly rounded both at the transistion to the legs or leg members 10 as well as also at the transition to the side surfaces 15.

Figure 2:
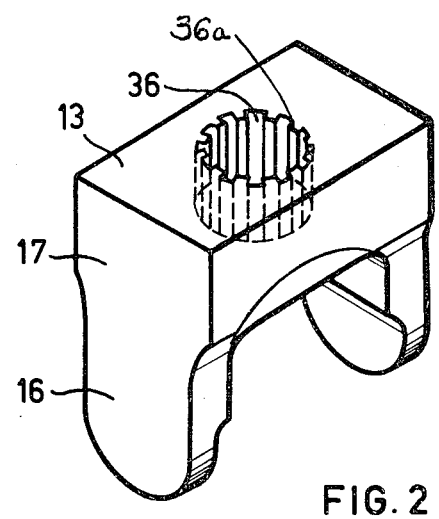
FIG. 2 illustrates the same body as shown in FIG. 1 but in its finished state.

Continuing, the substantially U-shaped fork-type body of FIG. 2 is formed by carrying out a further method step upon the body of FIG. 1. The legs 10 will be seen to possess at their lower region a portion 16 of smaller rectangular cross-section and at their top or upper region a portion 17 of larger rectangular cross-section. These cross-sections are rounded at all of the four corners. Also, at the transitions between the upper and lower portions or regions there are provided rounded portions. At the web 12 there is provided a blindhole bore 36. Also with this body there is present a completely flat fork base or bottom 13 having relatively sharp edges. All of the other edges are rounded.

Figure 3:
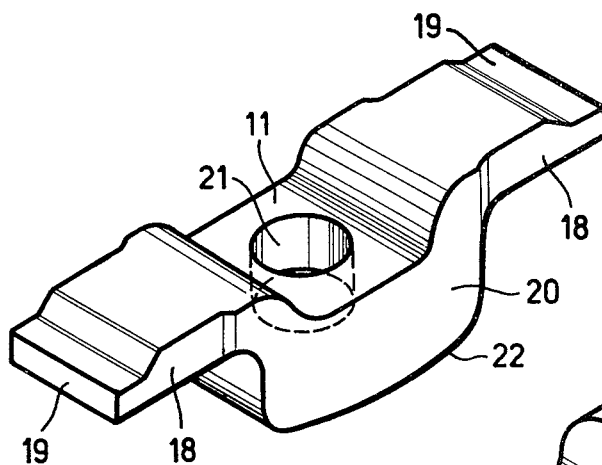
FIG. 3 illustrates in perspective view a different body, shown in a semi-finished state, and fabricated according to a second method of the invention.

The body or part shown in FIG. 3 will be seen to possess two legs or leg members 18, the free ends 19 of which have a smaller cross-section than the remaining cross-section of each such leg. The web 20 is arranged parallel to the legs 18 and has a bore 21. In contrast to the body shown in FIG. 1, with this body of the illustration of FIG. 3 the fork base 22 opposite the legs or leg members 18 is markedly rounded at all edges. Furthermore, the fork saddle 11 is constructed to be completely flat. The substantially U-shaped body shown in FIG. 4 has been produced by carrying out a further method step or operation upon the body depicted in FIG. 3. This body, which is produced according to a different method than the method employed in fabricating the body of FIG. 2, differs from the body of FIG. 2 by the following features:

(a) The fork base or bottom 22 is rounded at all four corners;
(b) The leg ends do not possess any flattened portions;
(c) The fork saddle 11 is completely flat.

Based upon the showing of FIGS. 5 to 10 there will be hereinafter described both of the manufacturing techniques for these U-shaped bodies or parts.

Figure 5:
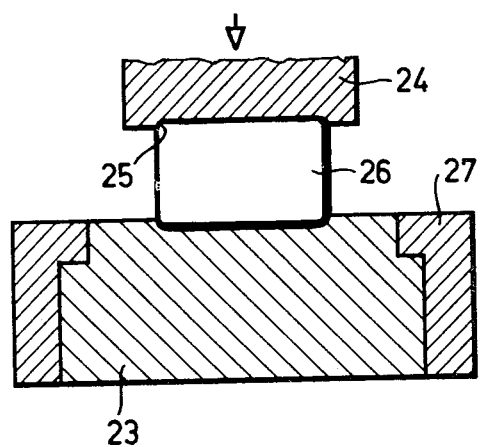
FIG. 5 illustrates a die and a punch for carrying out the first method step during the production of the body or part illustrated in FIGS. 1 and 2.

According to the showing of FIG. 5 there is formed between a die 23 and a punch 24, by cold working, a substantially parallelepiped body 26 from a cylindrical rod section. The punch 24 and the die 23 possess rounded portions 25 at their respective work surfaces, so that there are not formed any sharp edges during the forming work. The die 23 is secured by means of a ring-shaped holder 27 to a conventional and therefore not particularly illustrated press.

Figure 6:
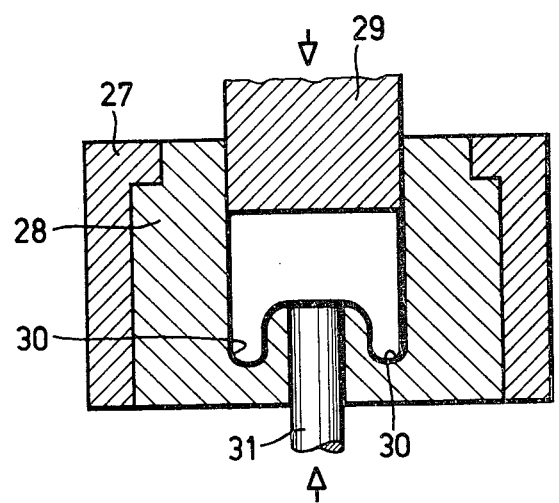
FIG. 6 illustrates a die and a punch used during the second method step for fabricating the body or part illustrated in FIGS. 1 and 2.

In FIG. 6 the parallelepiped-shaped body 26 has been introduced into a different die 28 and is cold worked by a punch 29 into a substantially U-shaped body or part. For this purpose, the die 28 possesses two recesses or depressions 30, corresponding to the shape of the legs or leg members 10. To facilitate removal of the U-shaped body out of the die 28 there is provided an ejector pin 31. The die 28, like the die 23, is attached in the holder 27.

Figure 7:
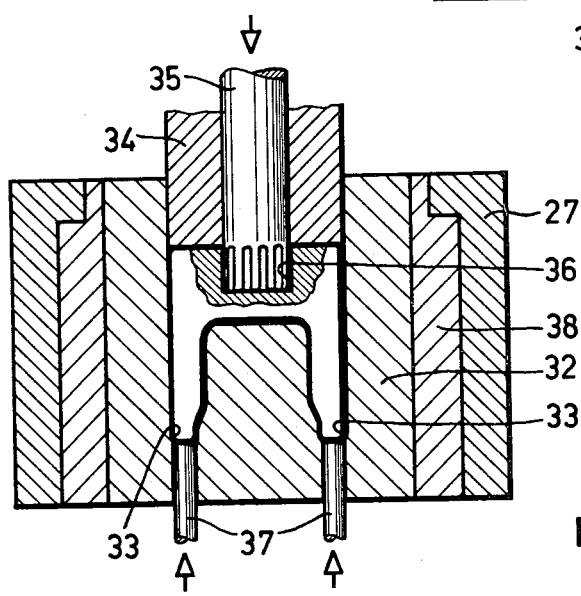
FIG. 7 illustrates a die and a punch used during the third method step for the production of the body illustrated in FIGS. 1 and 2.
Figure 8:
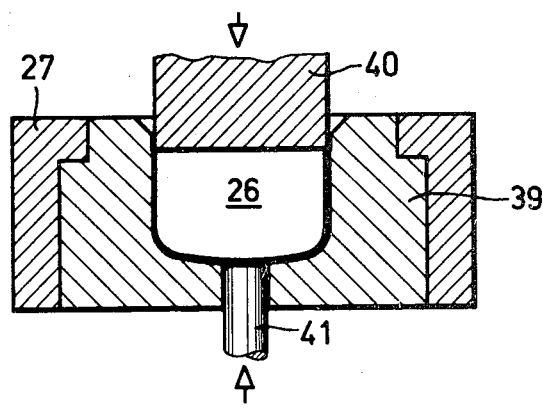
FIG. 8 illustrates a die and a punch used during the first method step for producing the body or part illustrated in FIGS. 3 and 4.

As shown in FIG. 7, the U-shaped body produced in the described manner, is inserted during a further working or method step into another die 32. This die 32 possesses longer recesses 33, into which there is pressed or extruded the U-shaped body, by cold working, with the aid of a punch 34. This punch 34 contains a pin 35 for forming the blindhole bore 36. Pin 35 can be provided with teeth, by means of which it is possible to produce internal teech 36a in bore 36, as best seen by referring to FIG. 2. In order to remove the U-shaped body from the die 32 there are required the two ejector pins 37 or equivalent structure. The die 32 is surrounded by a ring 38 and inserted into the holder 27.

With this method the shape of the U-shaped body or part is essentially determined by the die 32. The punch 34 only produces the flat or planar surface 13. In contrast thereto, according to a different method, which will be described more fully hereinafter in conjunction with FIGS. 8 to 10, the shape of the body is determined both by the die as well as also by the punch.

With this other method there is formed, during a first method step, as best seen by referring to FIG. 8, again a substantially parallelepiped-shaped body 26 from a strand section, by cold working, with the aid of a die 39 and a punch 40.

Figure 4:
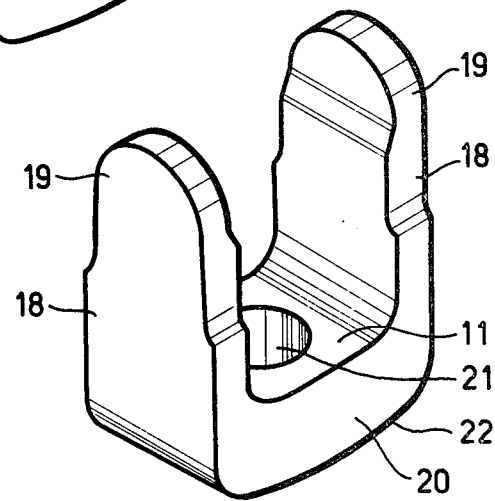
FIG. 4 illustrates the same body as shown in FIG. 3, but in its finished condition or state.
Figure 9:
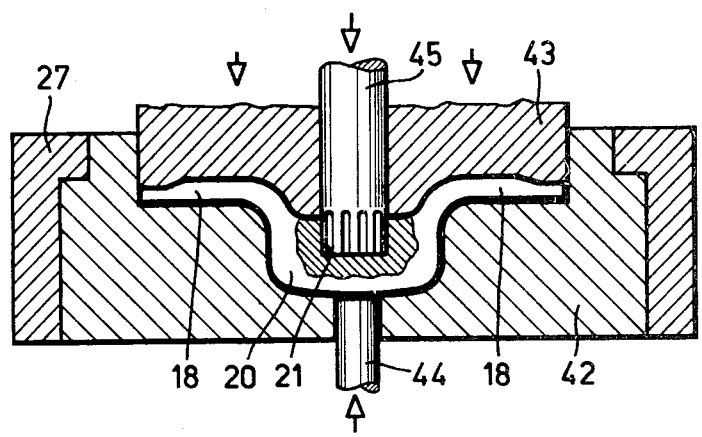
FIG. 9 illustrates a die and a punch used during the second method step for producing the body illustrated in FIGS. 3 and 4.

In a second method step, shown in FIG. 9, the legs or leg members 18 are formed with the aid of a die 42 and a punch 43. For ejecting the workpiece there is required an ejector pin 44 or an equivalent structure. A pin member 45 can be provided with teeth, by means of which there is produced the internal teeth of the bore 21. To preserve clarity in illustration and to simplify the showing of the drawings the internal teeth have not been shown in FIGS. 3, 4 and 9 but may be similar to the teeth 36a of FIG. 2. The die 42 is either rounded in such a manner that also the leg ends 19 are rounded, or, during a subsequent method step, the leg ends 19 are rounded by stamping, as shown in FIGS. 3 and 4.

Figure 10:
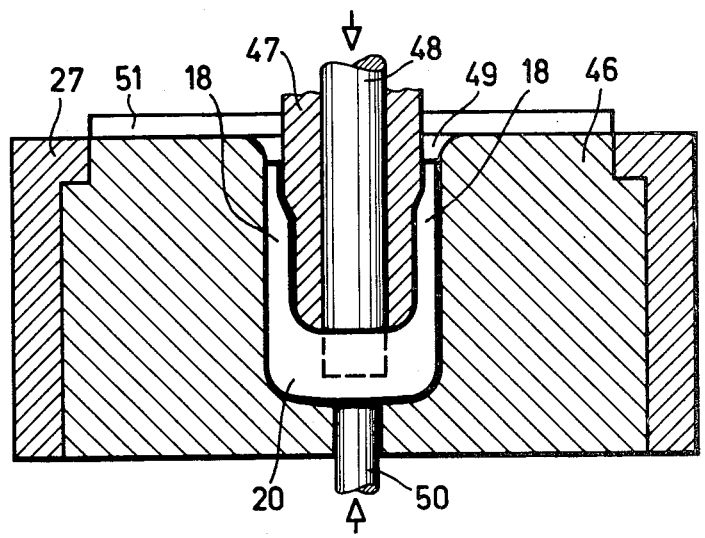
FIG. 10 illustrates a die and a punch used during the third method step for producing the body illustrated in FIGS. 3 and 4.

Finally, during a third method step the legs 18 are bent to the shape shown in FIG. 10. For this purpose there is provided a die 46 which, as illustrated, has a pin 50 for ejecting the finished body or part. For linearly guiding the body there is provided in the punch 47 a displaceable guide pin 48. Instead of upwardly ejecting the finished body out of the die 46 with the aid of the ejector pin 50, it is possible for the die to be open at its bottom, so that it is possible to push out the body with the aid of the punch 47 through the die 46. With this method step the web 20, as best seen by referring to FIG. 10, no longer is altered in its width. However, under certain circumstances it can be advantageous, during bending-up of the legs 18, to simultaneously decrease the width of the web 20. The die 46 preferably possesses grooves 51 into which there can be inserted the legs of the body as shown in FIG. 3.

This cold press or impact forming of U-shaped bodies, in contrast to heretofore known fabrication techniques has the following advantages:

(a) The requisite strength is attained by the cold working. A heat-treatment of the body is no longer necessary.
(b) Bores can be produced by cold working without any additional work operation.
(c) It is equally possible to produce by cold working, without any additional working step, the internal teeth.
(d) Such a U-shaped body can be formed to be more rigid, by cold working, than by stamping of sheet metal parts.
(e) Due to the cold press forming it is possible to avoid the need for the complicated heating of the body, which otherwise is necessary during forging. Hence, the dimensional accuracy or shape of the bodies is much greater.
(f) There is no need for removing burrs from forged parts.

The method aspects of the invention generally require the following method or working steps:

(a) Shearing of sections from round rod material or rods having a different cross-section;
(b) Flat pressing of the cylindrical sections into parallelepiped-shaped or flattened bodies;
(c) Pre-pressing these bodies into U-shaped bodies;
(d) Final pressing of the U-shaped body into its final shape and when necessary, erection of the legs from the position of FIG. 3 into the position of FIG. 4.

The pre-pressing can be dispensed with in certain instances.

While there are shown and described present preferred embodiments of the invention, it is to be distinctly understood that the invention is not limited thereto, but may be otherwise variously embodied and practiced within the scope of the following claims.

ACCORDINGLY,

I claim:

1. A punch and die arrangement for extruding two legs for a substantially bifurcated part of a Cardan joint from a substantially parallelpiped-shaped blank having four side surfaces and two end surfaces comprising:

a first die and a first punch cooperating with one another for the partial extrusion of the legs from the blank to form pre-formed extruded legs;

a second die and a second punch cooperating with one another for bringing the pre-formed legs into their final shape;

the first die and the first punch confining part of the four side surfaces and one end surface of the blank in order to prevent deformation of such surfaces;

each cooperating die and punch limiting a hollow compartment composed of a large substantially parallelpiped-shaped part and two small substantially parallelpiped-shaped parts;

the large part of the hollow compartment formed by the first die and the first punch serving for the reception of the blank;

the large part of the hollow compartment formed by the second die and the second punch serving for the reception of the blank having the partially extruded legs formed in the two small parts of the hollow compartment of the first punch and the first die;

both of the two small parts of each hollow compartment of both dies and punches serving for forming and confining the legs to be extruded from the blank.

2. The arrangement as defined in claim 1, wherein:

each die possesses a hollow compartment composed of a large parallelpiped-shaped part for the reception of the blank and two smaller substantially parallelpiped-shaped parts for the reception of the legs;

each punch having a substantially rectangular end surface having essentially the same area as the large parallelpiped-shaped part of the hollow compartment; and both of the smaller substantially parallelpiped-shaped parts being arranged essentially parallel to one another.

3. The arrangement as defined in claim 1, wherein:

the cooperating dies and the punches collectively limit both the larger substantially parallelpiped-shaped part as well as both of the smaller substantially parallelpiped-shaped parts of the respective hollow compartments;

the first punch having elongate, small, substantially parallelpiped-shaped parts defining said two small parts of the hollow mold compartment and extending substantially transversely with respect to the direction of displacement of the first punch; and the second die and the second punch cooperating to form thereat elongate, small, substantially parallelpiped-shaped parts of the hollow compartment extending essentially parallel to one another and defining said two small parts.

4. A method of extruding two legs for a bifurcated part of a Cardan joint from a substantially parallelpiped-shaped blank, comprising the steps of:

providing a substantially parallelpiped-shaped blank having four side surfaces and two end surfaces;

confining part of the four side surfaces and one end surface of the substantially parallelpiped-shaped blank, in order to prevent deformation of such surfaces;

then exclusively extruding the legs out of the other end surface of the blank by carrying out two extrusion steps;

said two extrusion steps comprising:

a first extrusion step emcompassing pre-forming the legs; and a second extrusion step encompassing forming the legs into their final shape.

5. The method as defined in claim 4, further including the steps of:

employing a punch displaceable in a predetermined direction for carrying out the extruding work;

completely loading by means of the punch said one end surface;

extruding the legs out of said other end surface which is opposite said one end surface in the direction of displacement of the punch; and pre-forming the legs essentially parallel to one another.

6. The method as defined in claim 4, further including the steps of:

employing a punch displaceable in a predetermined direction for carrying out the extruding work;

exclusively loading said one end surface by pressure exerted by the punch; and wherein:

the first extrusion step comprises extruding the legs out of said one end surface transversely with respect to the direction of displacement of the punch; and the second extrusion step comprises bending the legs essentially parallel to one another.

* * * * *